(12) United States Patent
Sakitani et al.

(10) Patent No.: US 7,988,167 B2
(45) Date of Patent: Aug. 2, 2011

(54) CONSTRUCTION MACHINE

(75) Inventors: Shintaro Sakitani, Hiroshima (JP); Sachiko Watanabe, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 678 days.

(21) Appl. No.: 11/862,708

(22) Filed: Sep. 27, 2007

(65) Prior Publication Data

US 2008/0084090 A1 Apr. 10, 2008

(30) Foreign Application Priority Data

Oct. 10, 2006 (JP) ................................. 2006-276020

(51) Int. Cl.
*B62D 25/22* (2006.01)
*B62D 25/24* (2006.01)

(52) U.S. Cl. ...................................... 280/163; 280/164.1

(58) Field of Classification Search .................. 280/163, 280/164.1, 165, 166, 169; 182/127
See application file for complete search history.

(56) References Cited

U.S. PATENT DOCUMENTS

| | | | | |
|---|---|---|---|---|
| 2,981,554 A * | 4/1961 | Mulder et al. | ............. | 280/164.1 |
| 4,074,786 A * | 2/1978 | Joubert | ........................ | 180/68.5 |
| 4,480,710 A * | 11/1984 | Hansen | ........................ | 180/68.5 |
| 6,340,191 B1 * | 1/2002 | Brady | ........................... | 296/37.6 |
| 6,485,088 B1 | 11/2002 | Miyachi et al. | | |
| 7,722,066 B2 * | 5/2010 | O'Bireck et al. | .......... | 280/164.1 |
| 2001/0030081 A1 * | 10/2001 | Morimoto et al. | .............. | 182/85 |

FOREIGN PATENT DOCUMENTS

| | | |
|---|---|---|
| JP | 2000-45332 | 2/2000 |
| JP | 2001-279714 | 10/2001 |
| JP | 2002-59953 | 2/2002 |
| JP | 2002-266377 | 9/2002 |
| JP | 2004-68262 | 3/2004 |
| JP | 2004-84356 | 3/2004 |
| JP | 2004-238916 | 8/2004 |
| JP | 2005-207028 | 8/2005 |

* cited by examiner

*Primary Examiner* — Hau V Phan
*Assistant Examiner* — Vaughn T Coolman
(74) *Attorney, Agent, or Firm* — Oblon, Spivak, McClelland, Maier & Neustadt, L.L.P.

(57) ABSTRACT

A highest footboard of steps serving as an up and down passage provided on the laterally opposite side to a cabin in an upper rotating body is located at a higher position than a highest footboard of steps of standard specifications. In a space which is height difference between the highest footboards, a fuel supply unit is installed. The steps are supported by a step supporting portion of a bracket provided in a device chamber through the fuel supply unit.

8 Claims, 6 Drawing Sheets

# CONSTRUCTION MACHINE

BACKGROUND OF THE INVENTION

1. Field of the Invention

The present invention relates to a construction machine provided with a fuel supply unit for fueling a fuel tank.

2. Description of the Related Art

THE RELATED ART will be described taking a hydraulic excavator of a preferred example of the present invention as an example.

In the hydraulic excavator, as shown in FIGS. 8 and 9, an upper rotating body 2 is rotatably mounted on a crawler type lower traveling body 1 around a vertical axis. On a front part of the upper rotating body 2, is attached a working attachment 9 provided with a boom 3, an arm 4, a bucket 5, and hydraulic cylinders (boom cylinder, arm cylinder and bucket cylinder) 6, 7 and 8 for operating the boom 3, the arm 4 and the bucket 5.

A cabin 11 is installed on one of left and right sides of an upper frame 10 provided in the upper rotating body 2 (in general, on the left side seen from the rear side, hereinafter a description will be given in this example).

A side cover 12 is provided in a side surface part on the other side of the cabin 11 (on the right side), and steps 13 also serving as a front cover are provided in a part lying over a front surface part and an upper surface part. In a device chamber 14 in a front part on the right side covered by the side cover 12 and the steps 13 are installed various devices such as a valve. On the rear side of the steps 13 (in a rear part of the upper frame on the right side) is installed a fuel tank 15.

The side cover 12 is attached so as to open outward taking the rear side as a supporting point. In a state that the cover is opened, a maintenance work to the device chamber 14 is performed from the right side.

The steps 13 are formed in a stair shape and function as an up and down passage for performing maintenance from the upper surface side to an engine room (not shown) provided in a rear part of the upper rotating body 2.

In Japanese Patent Laid-Open No. 2002-266377 (hereinafter, referred to as Patent Document 1), there is a technique that a fuel supply unit having a pump and a hose is installed in order to make easier a supply work of fuel to the fuel tank 15.

In this configuration, in the vicinity of the fuel tank in the upper frame, the fuel supply unit within a case is installed.

Meanwhile, although not related to the fuel supply unit, Japanese Patent Laid-Open No. 2004-84356 (hereinafter, referred to as Patent Document 2) discloses a technique that in a construction machine having steps, a tool box is provided on a top part of the steps, and Japanese Patent Laid-Open No. 2000-45332 (hereinafter, referred to as Patent Document 3) discloses a technique that a tool box is installed on the lower side of step footboards.

However, in the technique of Patent Document 1, since there is a need for ensuring an installation space which is exclusive to the fuel supply unit on the upper frame, it is difficult to apply the technique particularly to a small sized excavator which does not have an extra space.

Meanwhile, it may be considered that the techniques related to the tool box in Patent Documents 2 and 3 are used as an installation technique for the fuel supply unit.

However, when the fuel supply unit is installed on the top part of the steps, the fuel supply unit protrudes to the upper side of the top part of the steps so that lateral visibility from an operator in the cabin is deteriorated and outer appearance is also deteriorated. Alternatively, when height is limited in order to avoid the above problem, a capability of the fuel supply unit (such as hose length) is decreased.

When the fuel supply unit is installed on the lower side of the step footboards, that is, in the device chamber 14 shown in FIG. 9, an installation space for the devices is invaded by the fuel supply unit and becomes narrower.

As a countermeasure of this point, it can be thought that height of the footboards is increased for the installation space for the fuel supply unit.

However, the steps are supported by a bracket provided in the device chamber. Therefore, when a configuration of the entire steps is changed, a configuration of the bracket also has to be changed. Consequently, conversion becomes large scale and cost is increased. When the height of the entire footboards is increased, a position of an upper end of the steps becomes higher so that the visibility from the inside of the cabin and the outer appearance are deteriorated.

SUMMARY OF THE INVENTION

It is an object of the present invention to provide a construction machine in which a fuel supply unit is installed without the above mentioned adverse effects.

Firstly, the construction machine according to the present invention has the following basic configuration.

In the construction machine according to the present invention, a cabin is installed on one of left and right sides of an upper rotating body mounted on a lower traveling body, a device chamber in which various devices are housed is provided on the other side of the cabin, and a side surface on the outside of the device chamber is covered by a side cover and a front surface and an upper surface of the device chamber are covered by steps also serving as a front cover. Further, the steps are:

(A) formed by attaching a plurality of footboards in a stair shape to the inside of a step framework,
(B) supported by a bracket installed in the device chamber,
(C) configured such that as special specifications relative to standard specifications, under the condition that the step framework and the bracket are shared and upper ends of the steps are at the substantially same level in both the specifications, a fixed footboard is located at a higher level than a case of the standard specifications, and
(D) in the steps of the special specifications, provided with a fuel supply unit having a fuel supply pump and a fuel supply hose for supplying fuel oil to a fuel tank in a space which is height difference between the fixed footboards in both the specifications, and supported by the bracket through the fuel supply unit.

According to the present invention, the fuel supply unit is provided in the space which is the height difference between the fixed footboard in the standard specifications without the fuel supply unit and the fixed footboard in the special specifications with the fuel supply unit, and the steps are supported by the bracket through the fuel supply unit. Therefore, the following effects can be obtained.

(i) The bracket is shared in both the specifications, and further a minimum change that the fixed footboard is set at a higher position is only required for the special specifications.

Therefore, conversion can be small scale with low cost and the installation space for the devices is not invaded (the present invention can be easily applied to a small type machine).

(ii) Since the height difference between the footboards in both the specifications is utilized, it is possible to have sufficient height of the fuel supply unit in comparison to the case where the fuel supply unit is installed on the top part of the steps or` the like in an uncovered state, and to ensure a capability which is necessary for the fuel supply unit.

(iii) Since the configuration of the steps is changed under the condition that positions of the upper ends of the steps are at the substantially same level in both the specifications, there is no fear that the visibility from the inside of the cabin and the outer appearance are deteriorated.

That is, it is possible to install the fuel supply unit while solving the problems of the technique according to Patent Document 1 and avoiding the adverse effects generated when the techniques described in Patent Documents 2 and 3 are used.

In the present invention, it is preferable that in the above basic configuration, a box portion whose upper and lower surfaces are opened is provided in the step framework, and the fixed footboard is provided in an upper opening part of the box portion in a state that the footboard also serves as a lid for opening and closing the box portion.

In this case, since the fixed footboard also serves as the lid, it is possible to easily perform take-in and take-out or the like of the hose of the fuel supply unit installed on the lower side of the footboard from the directly upper side.

In the present invention, it is preferable that in the above basic configuration, in the steps of the special specifications, the fuel supply unit is provided in a space which is height difference between highest footboards in both the specifications.

In this case, the highest footboard which is the closest to the rear part of the upper rotating body in which the fuel tank is installed serves as the fixed footboard, and the fuel supply unit is provided on the lower side of the footboard. Therefore it is possible to arrange the fuel supply unit approaching to the fuel tank at maximum. Consequently, it is easy to treat the hose and perform the take-out and the take-in of the hose.

In the present invention, it is preferable that in the above basic configuration, in the steps of the special specifications, two steps of footboards are provided within depth of the fixed footboard in the standard specifications.

When a position of the fixed footboard is raised, difference from a one step lower footboard is increased. Therefore, there is sometimes a case where an original function of the steps as the up and down passage is disturbed. In this regard, according to the above configuration in which the two steps of footboards are provided, the two steps of footboards are provided within the depth of the fixed footboard in the standard specifications, in other words, the two steps of footboards form one step. Therefore, it is possible to ensure the original function of the steps as the up and down passage.

In the present invention, it is preferable that in the above basic configuration, a pump of an electrically powered type is provided as the fuel supply unit, and a switch of the pump is provided at a position where the switch is operated from a side surface of the machine in a state that the openable side cover is opened.

In this case, the switch of the pump of the fuel supply unit is provided at the position where the switch is operated from the side surface of the machine in a state that the openable side cover is opened. Therefore, an operation is easy in comparison to the case where the switch is operated from the upper surface side of the machine.

In the present invention, it is preferable that in the above basic configuration, in the steps of the special specifications, the fuel supply unit is attached on the fixed footboard in the standard specifications, and the fixed footboard is attached on the fuel supply unit.

In this case, the fuel supply unit is attached on the fixed footboard in the standard specifications, and the fixed footboard in the special specifications is attached on the fuel supply unit so as to form the steps of the special specifications. In other words, the specifications are changed by selection on whether or not the footboards are added to the steps of the standard specifications. Therefore, it is possible to quickly respond to a need of users and improve a manufacturing efficiency.

DESCRIPTION OF THE PREFERRED EMBODIMENTS

Figure 1:
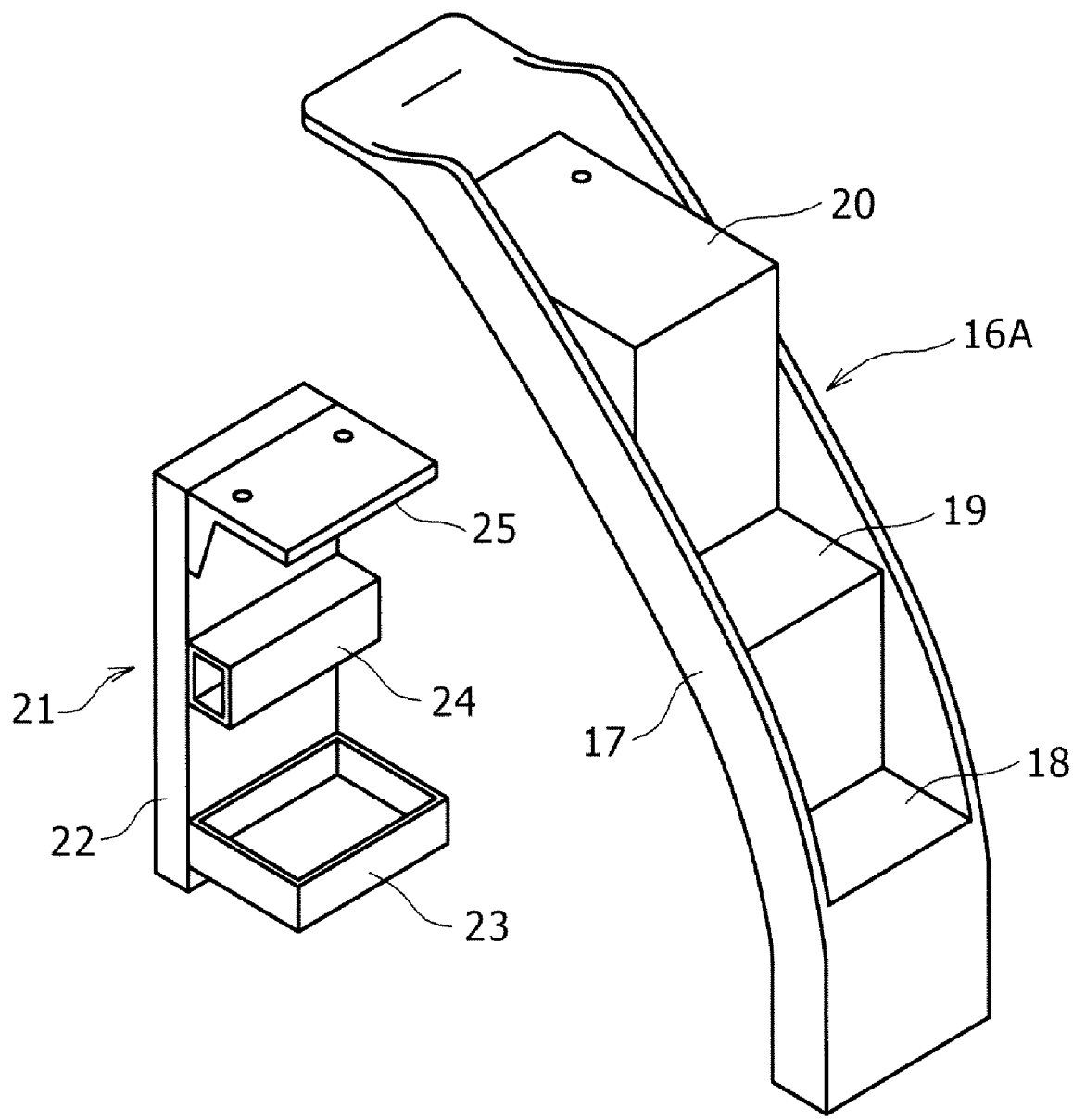
FIG. 1 is a perspective view of steps and related parts thereof of standard specifications according to a first embodiment of the present invention.

A description will be given to embodiments of the present invention with reference to FIGS. 1 to 7. In the following embodiments, the same parts as in THE RELATED ART shown in FIGS. 8 and 9 will be given the same reference numerals, and repeated explanation will be omitted.

First Embodiment

Refer to FIGS. 1 to 6

Figure 2:
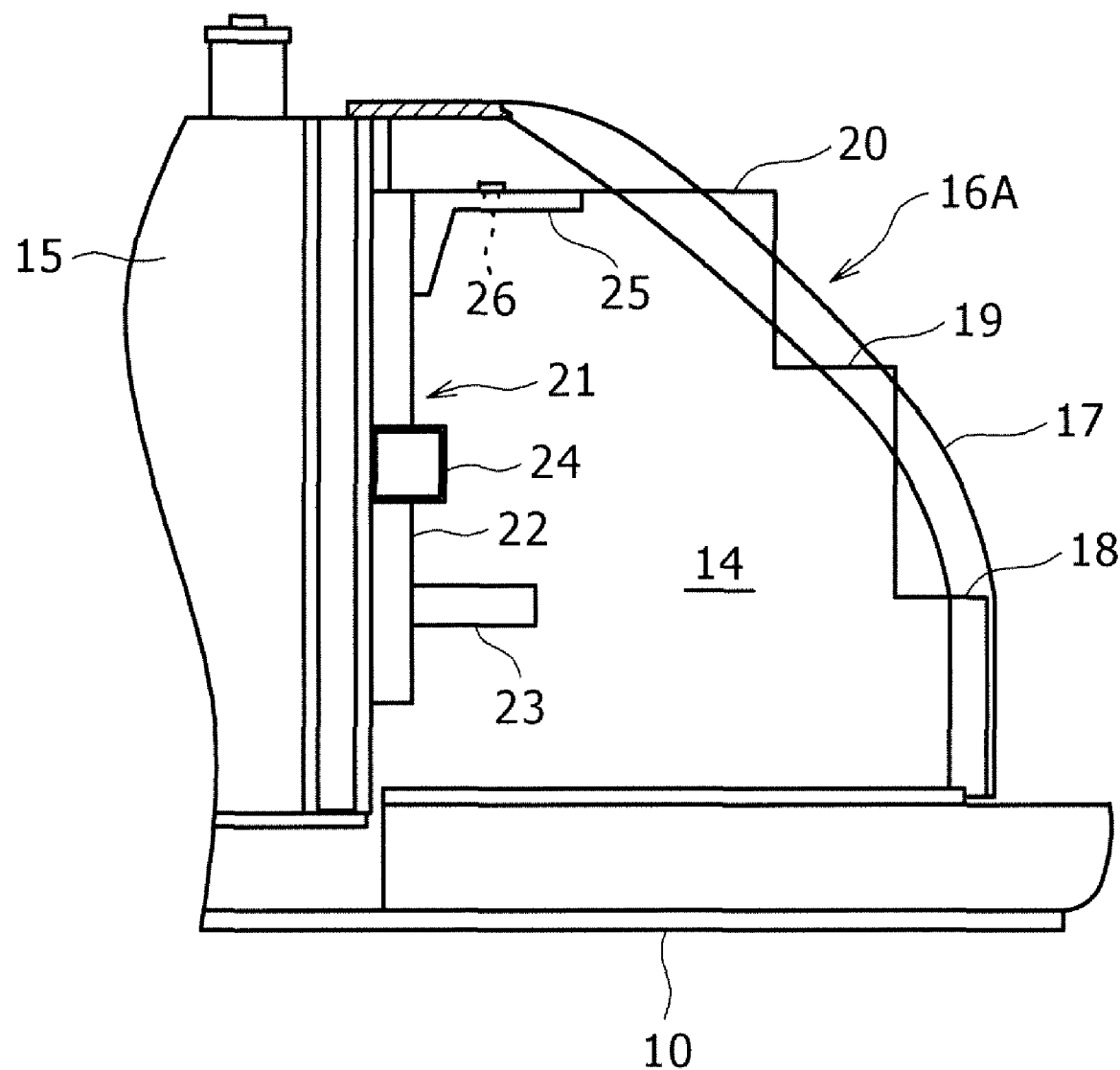
FIG. 2 is a sectional side view of the steps and the related parts thereof of the standard specifications.

FIGS. 1 and 2 show steps 16A of standard specifications which is not provided with a fuel supply unit and related parts thereof. FIGS. 3 to 6 show steps 16B of special specifications which is provided with a fuel supply unit and related parts thereof.

The steps 16A of the standard specifications are formed by attaching a plurality of footboards 18, 19 and 20 (in an example of the figure, there are three steps in total which are a first step, a second step and a third step from the bottom, hereinafter, a description will be given on the basis of this case) to a thin and long step framework 17 in a substantially picture frame shape.

In a device chamber 14 whose upper surface is covered by the steps 16A and 16B, a bracket 21 is provided on a rear part thereof serving as a shared part for supporting the steps 16A and 16B in both the specifications from the lower side.

The bracket 21 is formed such that to a bracket main body 22, are attached a tool box 23, a pin guide 24 for guiding a boom foot pin and a step supporting portion 25.

The step supporting portion 25 protrudes forward at an upper end of the bracket main body 22. In the case of the steps 16A of the standard specifications (hereinafter, called as the standard steps, and the steps 16B of the special specifications are called as the special steps), as shown in FIG. 2, a highest footboard 20 serving as a fixed footboard is screwed (may be welded or engaged) onto the step supporting portion 25. In FIG. 2, the reference numeral 26 denotes a screw for attachment of the highest footboard.

Figure 8:
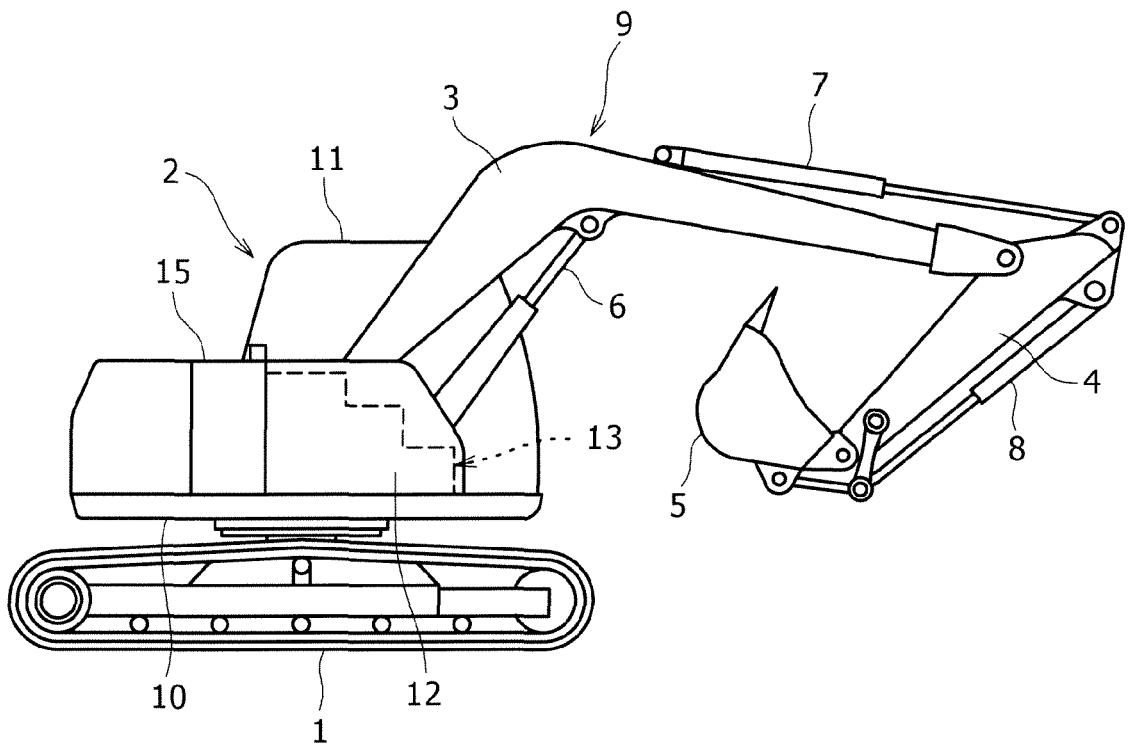
FIG. 8 is a schematic side view of a hydraulic excavator to which the present invention is applied.
Figure 9:
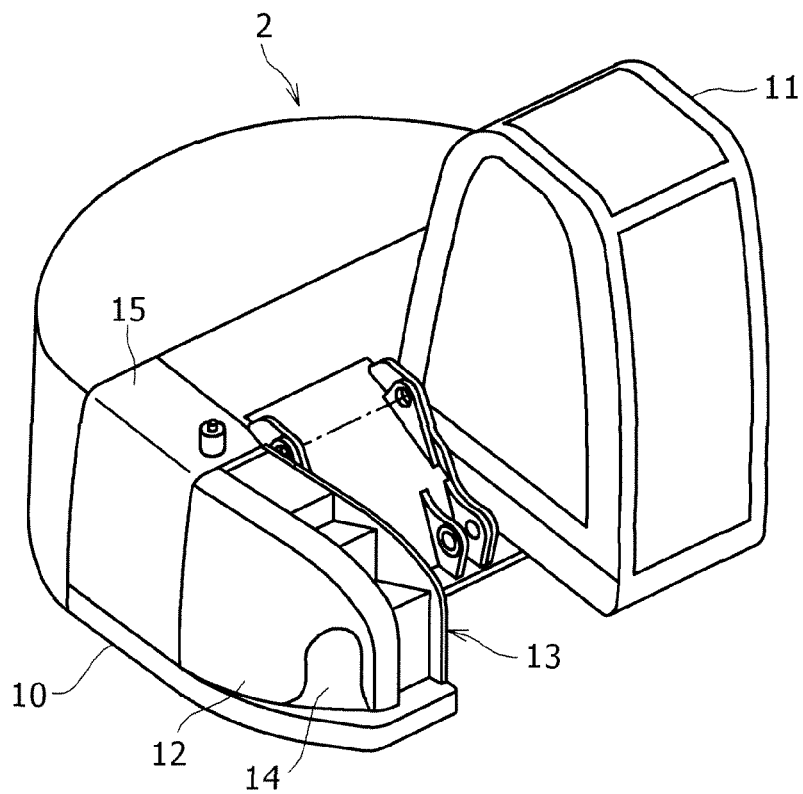
FIG. 9 is a schematic perspective view of an upper rotating body of the hydraulic excavator to which the present invention is applied.

It should be noted that as in THE RELATED ART shown in FIGS. 8 and 9, a fuel tank 15 is installed on the direct rear side of the steps 16A and 16B (in a rear part of an upper frame 10 on the right side).

Figure 4:
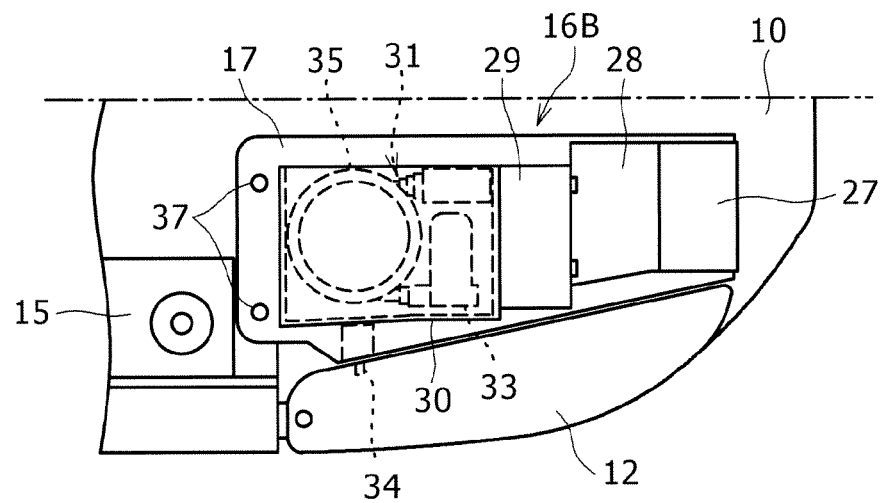
FIG. 4 is a plan view of the steps and the related parts thereof of the special specifications.
Figure 5:
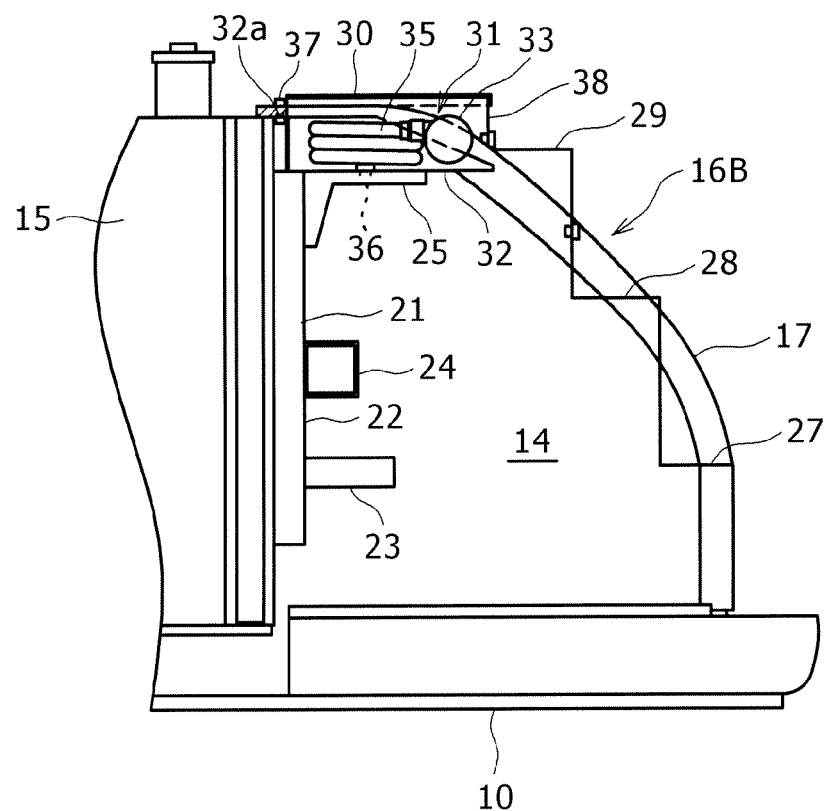
FIG. 5 is a sectional side view of the steps and the related parts thereof of the special specifications.
Figure 6:
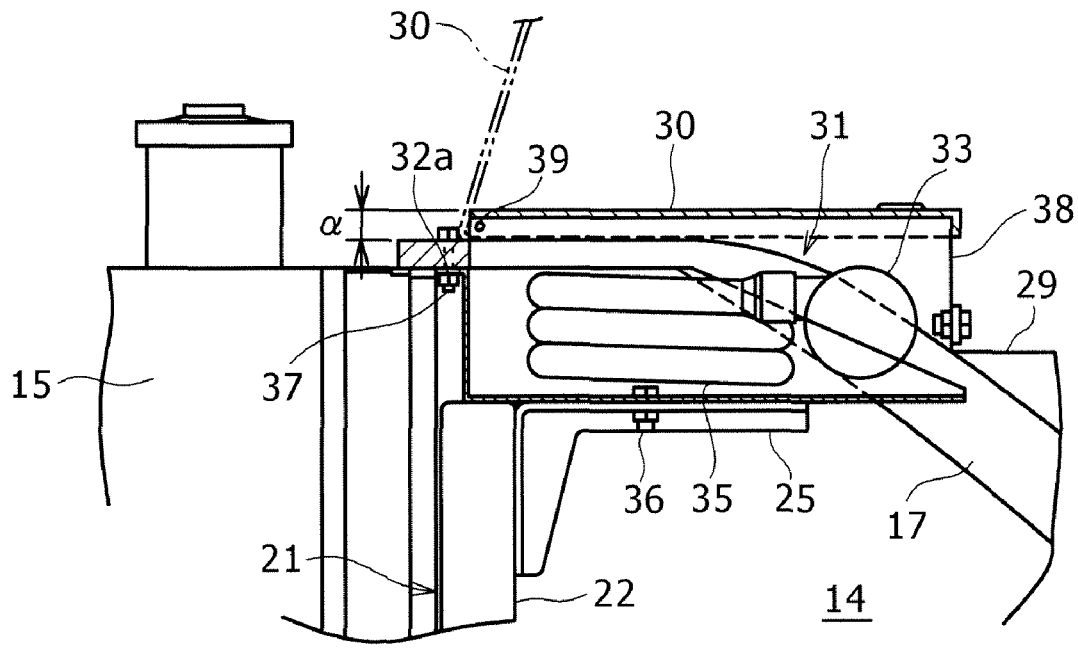
FIG. 6 is a partially enlarged view of FIG. 5.

Meanwhile, the special steps 16B is, as shown in FIGS. 4 to 6, formed such that in the step framework 17 shared with the standard step 16A, are attached four steps of footboards 27, 28, 29 and 30 which are one step more than the case of the standard steps 16A (a first step to a fourth step from the bottom), and on the lower side of the highest footboard 30 is installed a fuel supply unit 31.

Figure 3:
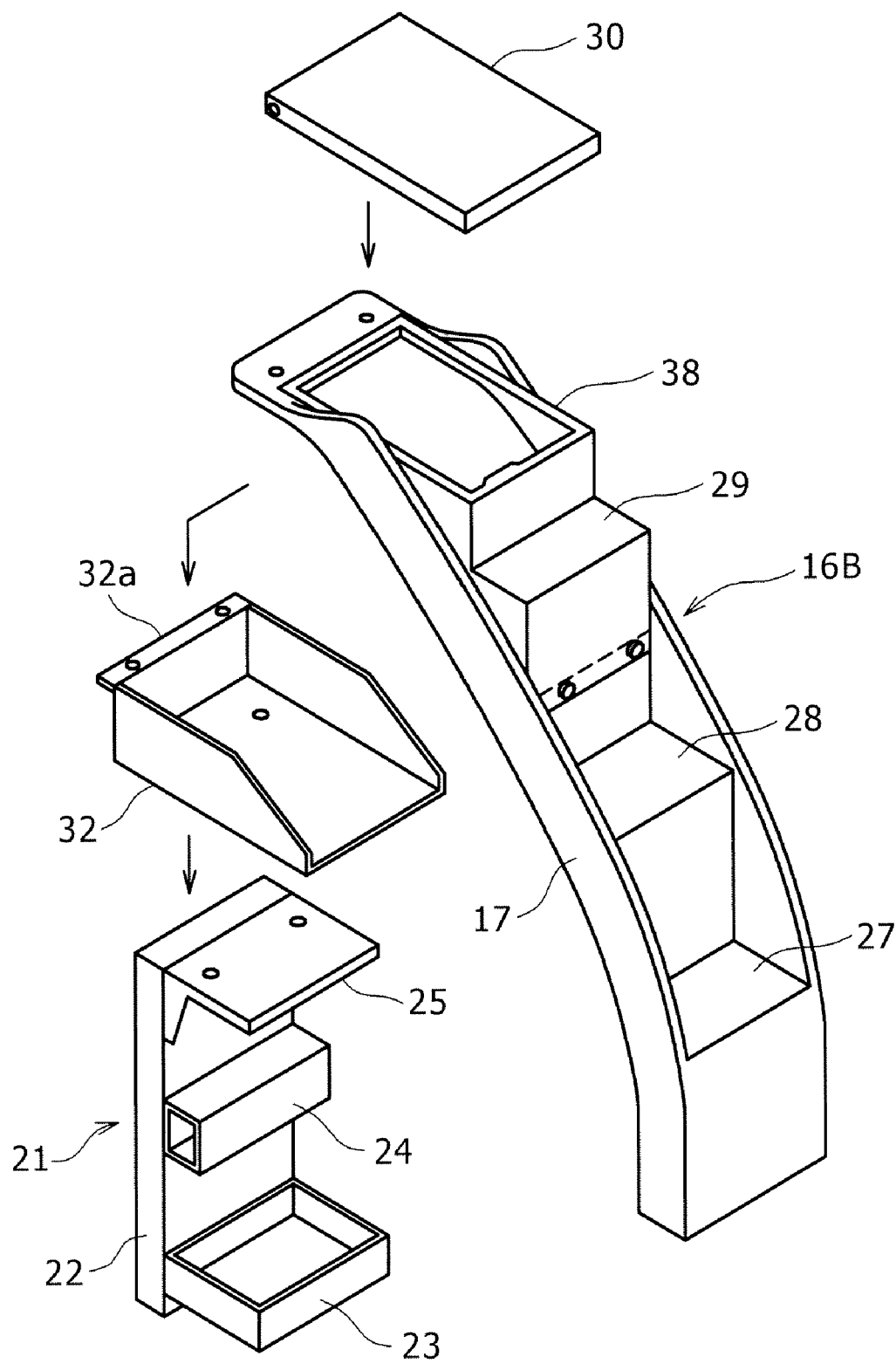
FIG. 3 is a perspective view of steps and related parts thereof of special specifications.

It should be noted that the step framework 17 is in fact, for convenience of design, a relatively complicated shape which is asymmetry and uneven on the inner surface side as shown in FIG. 4. However, FIGS. 1 and 3 show an entirely simplified symmetry step framework.

Next, a description will be given to a configuration of the special steps 16B in detail.

The fuel supply unit 31 is formed such that a pump 33 of an electrically powered type and a switch 34 for turning on/off the pump 33 are attached to a case 32 in a tray shape (refer to FIG. 4), and a fuel supply hose 35 is housed in a wound state in the case 32. Further, in the fuel supply unit 31, a bottom wall of the case 32 is screwed (may be welded or engaged) onto the step supporting portion 25 of the bracket 21. In FIGS. 5 and 6, the reference numeral 36 denotes a screw for attachment of the case.

In a rear end part of the case 32 is provided a horizontal step framework attachment portion 32a, and an upper end part of the step framework 17 is screwed (may be welded) in a state that the upper end part is supported by the step framework attachment portion 32a. In FIGS. 5 and 6, the reference numeral 37 denotes a screw for attachment of the step framework.

By this, the special steps 16B are supported by the step supporting portion 25 of the bracket 21 through the fuel supply unit 31 (case 32).

Here, in the case of the standard steps 16A, an upper surface of the upper end part of the step framework 17 is an upper end of the steps as shown in FIG. 2, while in the special steps 16B, an upper surface of the highest footboard 30 is an upper end of the steps. Thickness and the like of the fuel supply unit 31 are set so that the upper end of the steps is the substantially same as (in an example of the figure, a little length □ higher than) the upper end of the steps of the standard steps 16A.

The highest footboard 30 and the footboard 29 which is one step lower than the highest footboard 30 (the third step) of the special steps 16B are provided within depth of the highest footboard 20 of the standard steps 16A (there may be a little difference).

The discharge side of the pump 33 is connected to an upper part of the fuel tank 15 through a hose (not shown), and the intake side of the pump 33 is connected to the base end side of the fuel supply hose 35.

Therefore, in a state that the fuel supply hose 35 is taken out and the front end side thereof is taken into a drum, the switch 34 is operated and the pump 33 is driven so that fuel oil is supplied into the fuel tank 15.

The switch 34 is provided so as to protrude from the case 32 to the side cover 12 side as shown in FIG. 4. In a state that the side cover 12 is opened, the switch 34 can be operated from a side surface of the machine.

Meanwhile, in the upper end part of the step framework 17, that is, a part to which the highest footboard 30 is attached, and also a part which opposes to the fuel supply unit 31, is provided a square box portion 38 whose upper and lower surfaces are opened while protruding upward. The highest footboard 30 is attached to an upper opening part of the box portion 38 in a state that the footboard is rotated taking the rear side as a supporting point (in a state that the upper opening part is opened and closed). In FIG. 6, the reference numeral 39 denotes an opening and closing center axis for the highest footboard 30.

Thus, the highest footboard 30 also serves as an upper lid of the fuel supply unit 31, and as shown by a double dotted line in FIG. 6, the highest footboard 30 is opened so as to take in and out the fuel supply hose 35.

It should be noted that in the special steps 16B, the third footboard 29 is provided continuously to a front surface wall of the box portion 38. Although an example of the figure shows the case where the third footboard 29 is screwed to the front surface wall of the box portion 38, the third footboard 29 may be formed integrally with the front surface wall of the box portion.

The third footboard 29 and the second footboard 28 may be connected to each other at perpendicular wall parts thereof by a screw, or connected by welding.

As the first footboard 27 and the second footboard 28, both the first footboard 18 and the second footboard 19 of the standard steps 16A may be directly used, or the first footboard 27 and the second footboard 28 may be replaced by footboards which are exclusive to the special steps 16B.

As mentioned above, the fuel supply unit 31 is provided on the lower side of the highest footboard 30 of the special steps 16B, that is, in a space which is height difference between the highest footboard 30 and the highest footboard 20 of the standard steps 16A without the fuel supply unit 31. Through the fuel supply unit 31, the special steps 16B are supported by the bracket 21 (step supporting portion 25). Therefore, the bracket 21 is shared in both the steps 16A and 16B, and a change from the standard steps 16A to the special steps 16B is a minimum in which the highest footboard 30 is set at a higher position.

Consequently, conversion can be small scale with low cost. Since an installation space for the devices is not invaded, it is possible to apply to a small type machine.

In this case, since the height difference between the highest footboards 20 and 30 of both the steps 16A and 16B is utilized, it is possible to have sufficient height of the fuel supply unit 31 in comparison to the case where the fuel supply unit 31 is installed on the top part of the steps or the like in an uncovered state, and to ensure a capability which is necessary for the fuel supply unit 31 (such as hose length).

Further, since the configuration of the steps is changed under the condition that positions of the upper ends of the steps are at the substantially same level in both the steps 16A and 16B, there is no fear that visibility from the inside of the cabin 11 in FIGS. 8 and 9 and outer appearance are deteriorated.

That is, it is possible to install the fuel supply unit 31 while solving the problems of the technique according to Patent Document 1 and avoiding the adverse effects generated when the techniques described in Patent Documents 2 and 3 are used.

In addition, according to the configuration, there are the following advantages.

(I) In the special steps 16B, since the highest footboard 30 also serves as the upper lid for the fuel supply unit 31, it is possible to easily perform take-in and take-out or the like of the hose 35 of the fuel supply unit 31 from the directly upper side.

(II) Since the fuel supply unit 31 is provided on the lower side of the highest footboard 30 which is the closest to the fuel tank 15, it is easy to treat the hose 35 and perform take-out and take-in of the hose 35.

(III) In the special steps 16B, since the two steps of the highest footboard 30 and the footboard 29 which is one step lower than the highest footboard 30 are provided within the depth of the highest footboard 20 of the standard steps 16A, in other words, the two steps of footboards form one step, it is possible to set the difference between both the footboards 30 and 29 to proper size and to ensure an original function of the steps as an up and down passage.

(IV) As shown in FIG. 4, since the switch 34 of the pump 33 of the fuel supply unit 31 is provided at the position where the switch 34 is operated from the side surface of the machine in a state that the side cover 12 is opened, an operation is easy in comparison to the case where the switch 34 is operated from the upper surface side.

Second Embodiment

Figure 7:
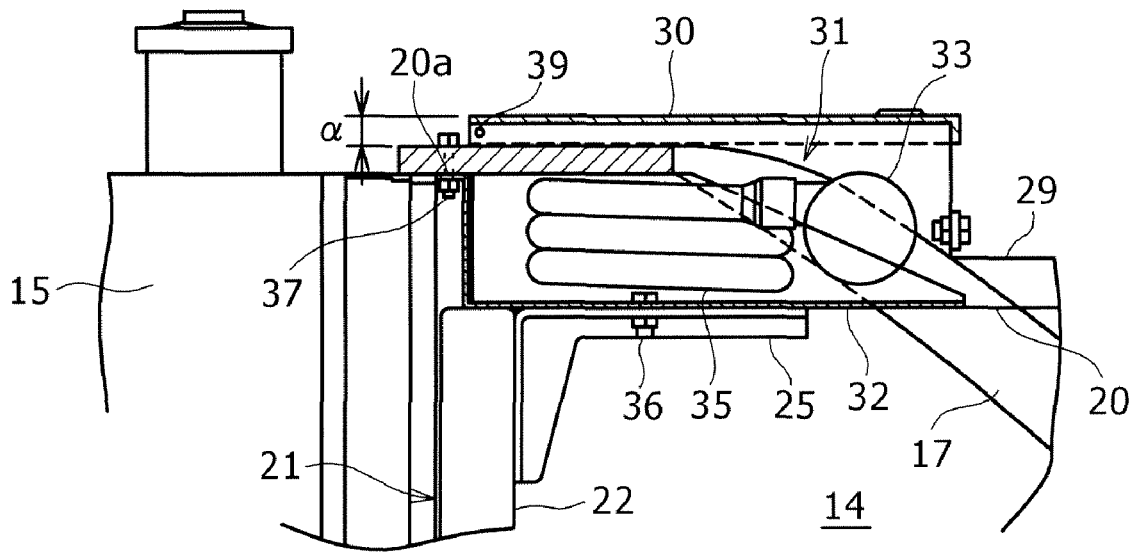
FIG. 7 is a view corresponding to FIG. 6 showing a second embodiment of the present invention.

Refer to FIG. 7

Different points from the first embodiment will only be described.

In the first embodiment, the third footboard 29 and the fourth footboard 30 are provided instead of the highest footboard 20 of the standard steps 16A, while in a second embodiment, the highest footboard 20 of the standard steps 16A is directly used and the case 32 of the fuel supply unit 31 is attached to an upper surface of the footboard 20.

In this case, the footboard 20 and the case 32 may be attached to the step supporting portion 25 of the bracket 21 at the same time. Only the footboard 20 may be attached to the step supporting portion 25 and then the case 32 may be separately attached to the footboard 20.

In an example of the figure, to a step framework attachment portion 20a extending rearward at a rear end of the footboard 20 is attached the upper end part of the step framework 17. However, as in the first embodiment, the upper end part of the step framework 17 is attached to the step framework attachment part 32a provided in the case 32.

According to the second embodiment, the standard steps 16A is directly used and the specifications is changed by selection on whether or not both the third footboard 29 and the fourth footboard 30 are added to the steps 16A. Therefore, it is possible to quickly respond to a need of users and improve a manufacturing efficiency.

In the above embodiments, the fuel supply unit 31 is provided on the lower side of the highest footboard 30 of the special steps 16B. However, according the circumstances, other footboards for example both the second and third footboards may be attached instead of the second footboard 19 of the standard steps 16A, or added on the upper side of the second footboard 19 so that the fuel supply unit 31 is installed in a space which is height difference between the second footboards.

In general, the side cover 12 is openably attached as in the above embodiments. However, it is possible to apply the present invention to a machine in which a side cover is not openable. In this case, the pump switch 34 may be provided at the position where the switch is operated from the upper surface side of the steps, or from a small window provided in the side cover 12.

Although the invention has been described with reference to the preferred embodiments in the attached figures, it is noted that equivalents may be employed and substitutions made herein without departing from the scope of the invention as recited in the claims.

We claim:

1. A construction machine, comprising:
a lower traveling body;
an upper rotating body having an upper frame which is mounted on said lower traveling body;
a cabin installed on one of left and right sides of said upper rotating body;
a device chamber in which various devices are housed, the device chamber being provided on the other side of said cabin and including a bracket main body standing on said upper frame, a tool box attached to said bracket main body, and a horizontally extending step supporting portion attached to said bracket main body above said tool box;
a side cover for covering a side surface on the outside of said device chamber;
a front cover for covering a front surface and an upper surface of said device chamber, wherein a plurality of steps including horizontal footboards are formed in the front cover, wherein an uppermost one of said footboards provides an uppermost portion of said front cover, and wherein said horizontally extending step supporting portion supports said front cover and is located below said uppermost one of said footboards to leave a vertical space between said horizontally extending step supporting portion and said uppermost one of said footboards; and
a fuel supply unit located in said vertical space, the fuel supply unit having a fuel supply pump and a fuel supply hose for supplying fuel oil to a fuel tank.

2. The construction machine according to claim 1, wherein a box portion is formed in the vertical space, wherein the fuel supply unit is located in said box portion, and wherein said uppermost one of said footboards is movably positioned on said front cover to serve as a lid for opening and closing the box portion.

3. A construction machine, comprising:
a lower traveling body;
an upper rotating body mounted on said lower traveling body;
a cabin installed on one of left and right sides of said upper rotating body;
a device chamber in which various devices are housed, the device chamber being provided on the other side of said cabin; and
a side cover for covering a side surface on the outside of said device chamber; and
steps also serving as a front cover for covering a front surface and an upper surface of said device chamber, wherein
said steps are:
(A) formed by attaching a plurality of footboards in a stair shape to the inside of a step framework;
(B) supported by a bracket installed in said device chamber;
(C) configured such that as special specifications relative to standard specifications, under the condition that the step framework and the bracket are shared and upper ends of said steps are at the substantially same level in both the specifications, a fixed footboard is located at a higher level than a case of the standard specifications; and (D) in said steps of the special specifications, provided with a fuel supply unit having a fuel supply pump and a fuel supply hose for supplying fuel oil to a fuel tank in a space which is height difference between the fixed footboards in both the specifications, and supported by the bracket through the fuel supply unit, wherein a box portion whose upper and lower surfaces are opened is provided in the step framework, and the fixed footboard is provided in an upper opening part of the box portion in a state that the footboard also serves as a lid for opening and closing the box portion, and wherein in said steps of the special specifications, the fuel supply unit is provided in a space which is height difference between highest footboards in both the specifications.

4. The construction machine according to claim 3, wherein in said steps of the special specifications, two steps of footboards are provided within a depth of the fixed footboard in the standard specifications.

5. A construction machine, comprising:
a lower traveling body;
an upper rotating body mounted on said lower traveling body;
a cabin installed on one of left and right sides of said upper rotating body;
a device chamber in which various devices are housed, the device chamber being provided on the other side of said cabin;
a side cover for covering a side surface on the outside of said device chamber; and
steps also serving as a front cover for covering a front surface and an upper surface of said device chamber, wherein
said steps are:
 (A) formed by attaching a plurality of footboards in a stair shape to the inside of a step framework;
 (B) supported by a bracket installed in said device chamber;
 (C) configured such that as special specifications relative to standard specifications, under the condition that the step framework and the bracket are shared and upper ends of said steps are at the substantially same level in both the specifications, a fixed footboard is located at a higher level than a case of the standard specifications; and
 (D) in said steps of the special specifications, provided with a fuel supply unit having a fuel supply pump and a fuel supply hose for supplying fuel oil to a fuel tank in a space which is height difference between the fixed footboards in both the specifications, and supported by the bracket through the fuel supply unit, wherein a pump of an electrically powered type is provided as the fuel supply unit, and a switch of the pump is provided at a position where the switch is operated from a side surface of the machine in a state that the openable side cover is opened.

6. The construction machine according to claim 5, wherein in said steps of the special specifications, two steps of footboards are provided within a depth of the fixed footboard in the standard specifications.

7. A construction machine, comprising:
a lower traveling body;
an upper rotating body mounted on said lower traveling body;
a cabin installed on one of left and right sides of said upper rotating body;
a device chamber in which various devices are housed, the device chamber being provided on the other side of said cabin;
a side cover for covering a side surface on the outside of said device chamber; and
steps also serving as a front cover for covering a front surface and an upper surface of said device chamber, wherein
said steps are:
 (A) formed by attaching a plurality of footboards in a stair shape to the inside of a step framework;
 (B) supported by a bracket installed in said device chamber;
 (C) configured such that as special specifications relative to standard specifications, under the condition that the step framework and the bracket are shared and upper ends of said steps are at the substantially same level in both the specifications, a fixed footboard is located at a higher level than a case of the standard specifications; and
 (D) in said steps of the special specifications, provided with a fuel supply unit having a fuel supply pump and a fuel supply hose for supplying fuel oil to a fuel tank in a space which is height difference between the fixed footboards in both the specifications, and supported by the bracket through the fuel supply unit, wherein in said steps of the special specifications, the fuel supply unit is attached on the fixed footboard in the standard specifications, and the fixed footboard is attached on the fuel supply unit.

8. The construction machine according to claim 7, wherein in said steps of the special specifications, two steps of footboards are provided within a depth of the fixed footboard in the standard specifications.

* * * * *